(12) United States Patent
Draper

(10) Patent No.: US 11,345,200 B2
(45) Date of Patent: May 31, 2022

(54) HITCH BAR

(71) Applicant: HORIZON GLOBAL AMERICAS INC., Plymouth, MI (US)

(72) Inventor: Owen W. Draper, West Bloomfield, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 498 days.

(21) Appl. No.: 16/338,892

(22) PCT Filed: Oct. 4, 2017

(86) PCT No.: PCT/US2017/055080
§ 371 (c)(1),
(2) Date: Apr. 2, 2019

(87) PCT Pub. No.: WO2018/067664
PCT Pub. Date: Apr. 12, 2018

(65) Prior Publication Data
US 2021/0300135 A1 Sep. 30, 2021

Related U.S. Application Data

(60) Provisional application No. 62/403,758, filed on Oct. 4, 2016.

(51) Int. Cl.
*B60D 1/42* (2006.01)
*B60D 1/46* (2006.01)
(52) U.S. Cl.
CPC . *B60D 1/42* (2013.01); *B60D 1/46* (2013.01)
(58) Field of Classification Search
CPC ................................ B60D 1/42; B60D 1/46

USPC ....................................................... 280/290.1
See application file for complete search history.

(56) References Cited

U.S. PATENT DOCUMENTS

| 4,792,151 | A | 12/1988 | Feld | |
|---|---|---|---|---|
| 6,139,043 | A * | 10/2000 | Gries | B60D 1/00 280/491.5 |
| 6,341,795 | B1 * | 1/2002 | Zerkel | B60D 1/065 280/490.1 |
| 7,637,255 | B1 | 12/2009 | Freeland | |
| 8,033,563 | B2 * | 10/2011 | Good | B60D 1/583 280/490.1 |
| 8,979,112 | B2 | 3/2015 | Weipert | |
| 9,193,243 | B2 * | 11/2015 | Ono | B60G 17/01908 |

(Continued)

OTHER PUBLICATIONS

International Search Report and Written Opinion dated Mar. 5, 2018; International Patent Application No. PCT/US2017/055080 filed Dec. 7, 2017; ISA/US.

*Primary Examiner* — Tony H Winner
(74) *Attorney, Agent, or Firm* — McDonald Hopkins LLC

(57) ABSTRACT

A hitch bar with improved strength incorporating a protruded flanges or wings is provided. The protruded portion may be attached to the frame. The protruded portion may include a profile oriented at a substantially perpendicular angle relative to the frame. The profile may provide a zone of distributing a load throughout the hitch bar. The hitch bar may further include a slotted opening integrated with the horizontal portion providing additional zone of distributing a load along the frame. The hitch bar may further include a plurality of cross members at the transitional portion having a second profile.

17 Claims, 8 Drawing Sheets

(56) References Cited

U.S. PATENT DOCUMENTS

| | | |
|---|---|---|
| 9,199,520 B2 | 12/2015 | Weipert |
| 2004/0084493 A1 | 5/2004 | Young et al. |
| 2004/0222614 A1* | 11/2004 | Lindenman ............ B60D 1/247 |
| | | 280/455.1 |
| 2008/0164678 A1* | 7/2008 | White ................... B60D 1/143 |
| | | 280/504 |
| 2009/0295123 A1* | 12/2009 | Good ....................... B60D 1/46 |
| | | 280/490.1 |
| 2010/0127479 A1 | 5/2010 | Weipert et al. |
| 2010/0133785 A1* | 6/2010 | McCoy ................... B60D 1/07 |
| | | 280/490.1 |
| 2012/0085884 A1* | 4/2012 | Eckhart ................ B60D 1/247 |
| | | 248/674 |
| 2012/0112433 A1* | 5/2012 | Williams, Jr ............ B60D 1/46 |
| | | 280/490.1 |
| 2012/0119467 A1 | 5/2012 | Svihla |
| 2013/0020784 A1 | 1/2013 | Weipert et al. |
| 2016/0297264 A1* | 10/2016 | Bernart ................... B60D 1/52 |
| 2018/0265007 A1* | 9/2018 | Good ....................... B60D 1/06 |
| 2019/0225037 A1* | 7/2019 | Kang ....................... B60D 1/24 |

\* cited by examiner

FIG. 2 - PRIOR ART

HITCH BAR

CROSS-REFERENCE TO RELATED APPLICATIONS

This application is a 35 U.S.C. § 371 national stage application of PCT Application No. PCT/US2017/055080 filed on Oct. 4, 2017, entitled "HITCH BAR," which claims priority to U.S. Provisional Patent Application No. 62/403,758 entitled "HITCH BAR WITH FLANGED PROFILE," filed on Oct. 4, 2016, each of which are hereby incorporated by reference in their entirety.

FIELD OF INVENTION

The present invention relates generally to hitch accessories and, more specifically, a hitch bar having a flanged profile for improved load distribution when operatively connected with a standard sized receiver hitch.

BACKGROUND

Many vehicles are designed to transport freight, goods, merchandise, personal property, and other such cargo. Often, such vehicles are arranged to tow a towed vehicle, such as a trailer by attaching the towed vehicle to the towing vehicle though the use of a hitch bar and receiver hitch. For example, a hitch bar may be a part of the overall mechanism to attach a trailer to a towing vehicle such as through a receiver hitch, hitch ball and coupler arrangement. This configuration allows relative movement between the towing vehicle and the trailer as the towing vehicle moves, such as in making turns, traversing uneven or rough terrain, and passing along inclining and declining roadways.

The standard receiver hitch and coupler arrangement necessarily restricts the cross sectional profile of the applicable hitch bar. This predetermined shape of the standardized receiver hitch arrangement may also create stress areas on the hitch bar proximally and distally, which may be a limit to the overall hitch bar towing capacity. In order to improve strength and towing capacity for the hitch bar, it may be necessary to use higher strength materials, which usually increases overall costs.

Therefore, there is a need for a hitch bar with increased bending moment of inertia and overall strength that may improve the hitch bar's towing capacity without the need for high cost materials while also being able to operatively fit within a standard receiver hitch (or more specifically the receiver tube of the receiver hitch). The present teachings, however, are not limited to this benefit. There may be other and additional benefits of the present teachings as evident from the disclosure below.

SUMMARY

A hitch bar with improved strength incorporating protruded flanges or wings is provided. The hitch bar may comprise a vertical portion and a transition portion connected to the vertical portion. The hitch bar may also comprise a horizontal portion that may be connected to the transitional portion and positioned at an opposite end of the vertical portion. The hitch bar may also comprise a protruded portion attached to the horizontal portion. The protruded portion may include a profile oriented at a substantially perpendicular angle relative to the horizontal portion. The profile may provide a zone of distributing a load along the horizontal portion. The protruded portion may further include an opening. The protruded portion may also include a density profile. The hitch bar may further comprise a slot integrated with the protruded portion extending along the horizontal portion. The hitch bar may further comprise a slotted opening integrated with the horizontal portion providing additional zone of distributing a load along the horizontal portion. The hitch bar may further comprising a cross member in the transitional portion including a second density profile.

In some embodiments, a hitch bar may comprise a vehicle attachment member, a shank, and a guide member. The vehicle attachment member may be capable of selective engagement with a towing vehicle. The shank may extend from the vehicle attachment member and have a length. The guide member may be positioned in and extending at least a portion of the length of the shank. A protruded portion may be attached to the vehicle attachment member. The protruded portion may comprise a profile oriented at a substantially perpendicular angle relative to the vehicle attachment member. The profile may distribute a load along with vehicle attachment member.

DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality, such those from other described embodiments herein. It is further noted that while various embodiments refer to a hitch bar, various other systems may be utilized in view of embodiments described herein. Further, the present system may include a variety of components, not limited to the components discussed below. Optionally, the present system may include multiple units of the same components. In an embodiment, the present system may include just the hitch bar described herein. Further, the present system may include components of each of the hitch bar to create a combination of each feature of the various systems.

Figure 1:
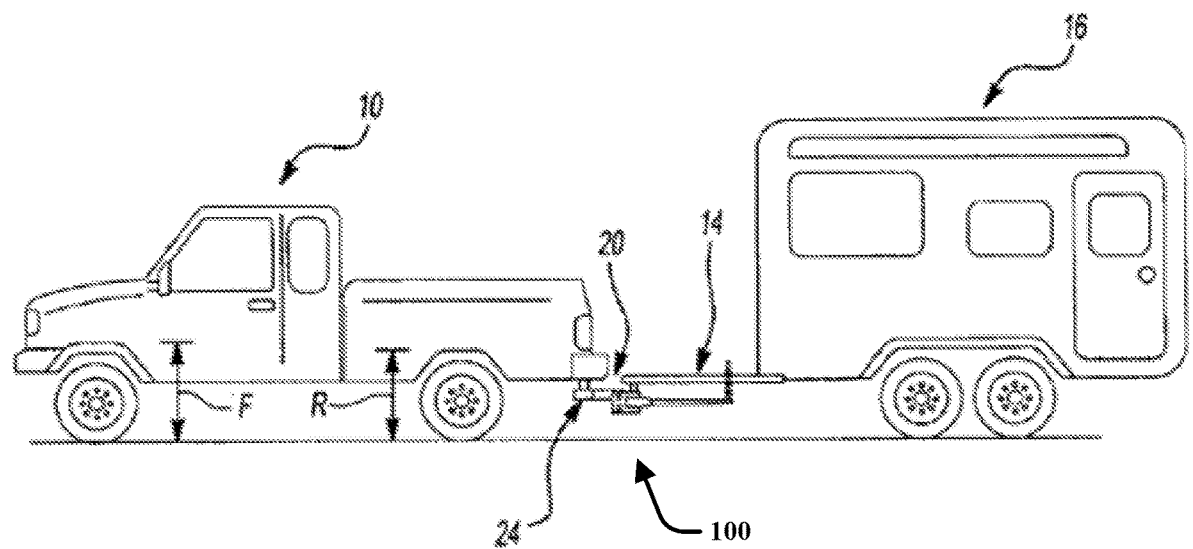
FIG. 1 is a perspective view of a towing vehicle and a trailer with a hitch bar.

With reference to FIG. 1, a hitch assembly 20 is shown. As is very well known in the art, a towing vehicle 10 may be provided with a hitch assembly 20 that is connected to a tongue 14 of a trailer 16. The tongue 14 of the trailer 16 may be attached to the hitch assembly 20 as shown in FIG. 1 in order to distribute some of the weight of the trailer to the front axle of the towing vehicle 10 and to the axles of the trailer 16. As best shown in FIG. 1, the hitch assembly 20 of the present teachings may include a hitch bar 100 which is adapted to be selectively connected to a hitch receptacle (or a receiver tube) 24 mounted to the rear portion of the vehicle 10. By way of a non-limiting example, the hitch assembly 20 may include a receiver hitch, which may be attached to the frame of the towing vehicle in any manner. The present teachings are not limited to a specific receiver hitch, but may be utilized with any type or configuration of receiver hitch. A merely exemplary receiver hitch may include a REESE custom fit hitch or REESE multi-fit hitch. The receiver hitch may include a receiver tube, such as a generally square receiver tube, that may be of any appropriate size. An example of such sizes may include 1.25-inch×1.25 inch (Class I and II hitches), 2-inch×2-inch (Class III and IV hitches), 2-inch×2-inch (heavy duty), 2.5 inch×2.5 inch (Class V hitch) and 3-inch×3-inch (heavier duty). The present teachings, however, are not limited to these sizes. The hitch bar 100 may be of a size to operatively fit any one of the above-mentioned receiver tubes.

Figure 2:
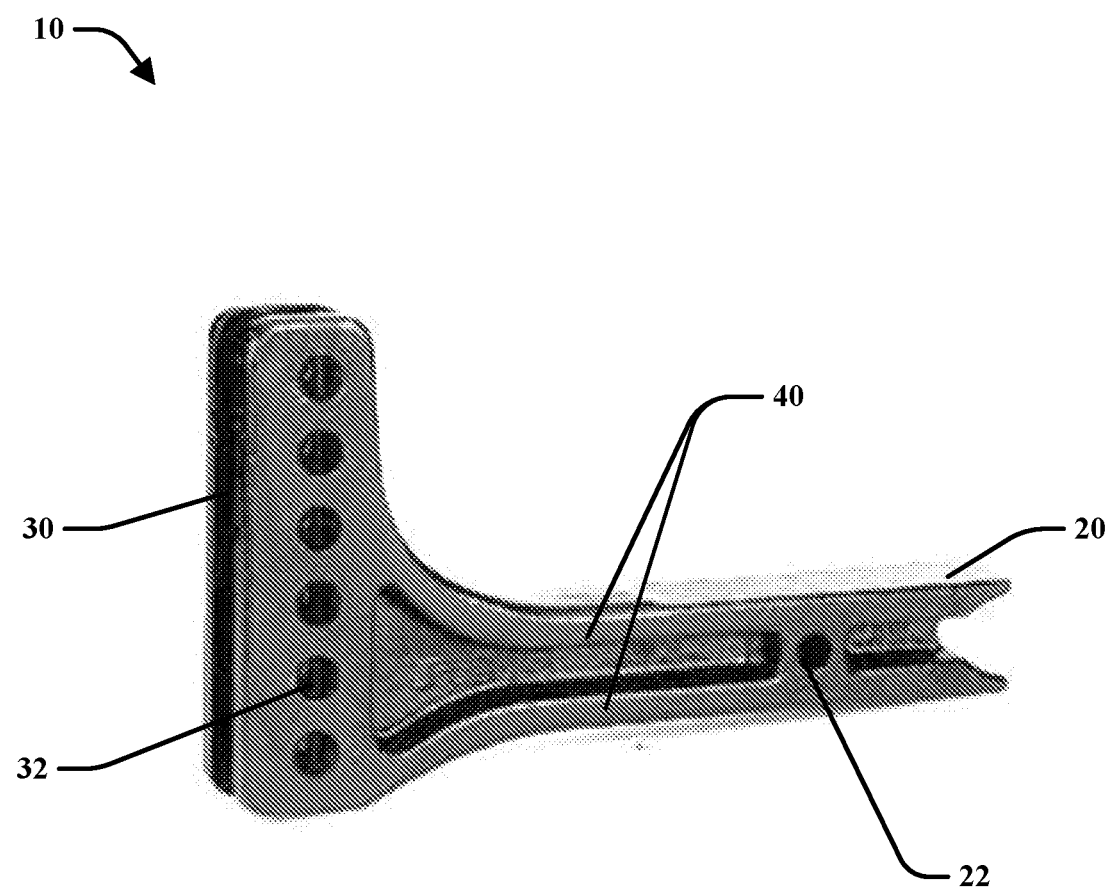
FIG. 2 is a perspective view of a prior art version of a hitch bar.

FIG. 2 illustrates one type of hitch bar 10 currently in use, i.e., a prior art hitch bar. A vehicle facing end 20 may cooperate with the receiver hitch (or more specifically the receiver tube) to accept a hitch pin (not shown) via aperture 22. At the opposing, towing end 30, a series of apertures 32 are provided to accommodate various towing accessories. The apertures 32 may allow for selection of differing elevations for the towing accessory relative to what would be available if the accessory was connected directly to the vehicle's receiver hitch. Reinforcing cross members 40 have gussets or an I-beam style profile formed along the top and bottom of the hitch bar 100 to provide added strength and stability, in addition to being sized and spaced to cooperate with the receiver hitch.

Figure 3:
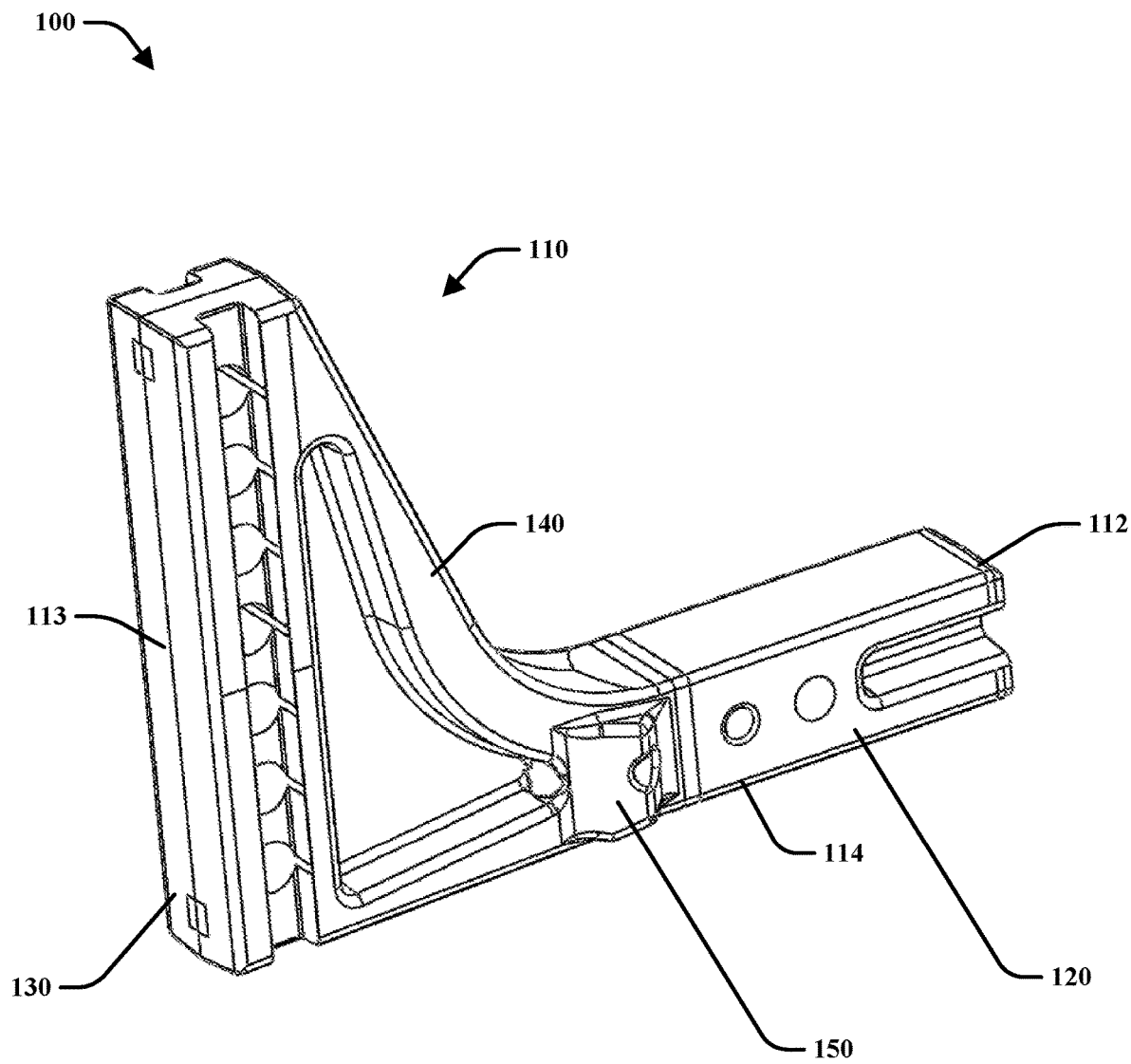
FIG. 3 is a perspective view of an embodiment of a hitch bar described herein.

FIG. 3 illustrates an embodiment of a hitch bar 100 in accordance with the instant disclosure. The hitch bar 100 may include a vehicle end (or a vehicle attachment portion) 112 and an opposite towing end (or a shank) 113 along with a base end 114. These ends 112, 113, 114 may intersect to form a generally L-shaped configuration to allow the base end 114 to be positioned generally perpendicularly related to the vehicle end 112. The vehicle end 112 of the hitch bar 100 may be selectively coupled to the hitch receptacle 24 (or a receiver tube) in any appropriate manner.

In one embodiment, the hitch bar 100 may include a frame 110 having a horizontal portion 120, a vertical portion 130, and a transitional portion 140. The horizontal portion 120 may be positioned at the vehicle end 112 and may include a generally square or rectangular shape configured to be operatively inserted into the hitch receptacle 24 (or the receiver tube). In some embodiments, the horizontal portion 120 may include a generally I-beam shape. The present teachings, however, are not limited to this shape. Any appropriate shape may be utilized, such as one that is generally square or rectangular, one generally square or rectangular with an additional cut-out and the like.

The vertical portion 130 or shank may be positioned at the towing end 113 and may include a generally I-beam shape. The vertical portion 130, however, may be of any appropriate shape, including, without limitation being generally circular or oval in shape. Additional exemplary embodiments of the vertical portion 130 may include those embodiments shown in U.S. Pat. Nos. 8,979,112 and 9,199,520, which are both incorporated herein by reference. The transitional portion 140 may be connected to the horizontal portion 120 and extend along the base end 114 from the vehicle end 112 to the opposite towing end 113. A protruded portion or wing 150 may be positioned in the transitional portion 140 in proximity to the horizontal portion 120.

The frame 110 may be manufactured by forming a sheet-metal such as a monolithic member or may be formed through a subsequent forming operation such as welding the components together. In some embodiments, the frame 110 may be formed such as through extruding. By way of a non-limiting example, the frame 110 may be extruded as a single piece, which may result in the frame 110 being a one-piece hitch bar. Further, the frame 110 may be formed such as through casting. The present teachings, however, are not limited to the formation processes described herein. Any appropriate formation process is contemplated herein.

Figure 4A:
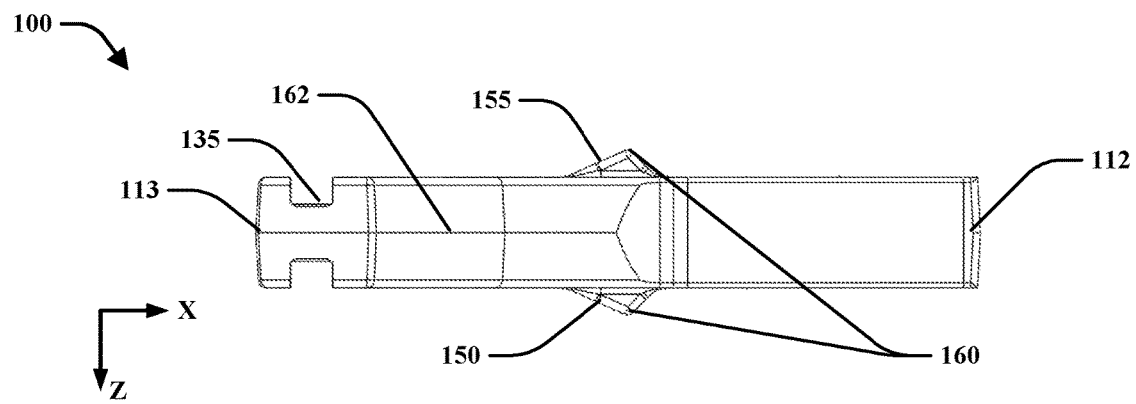
FIG. 4A is a top view of the embodiment of the hitch bar.
Figure 4B:
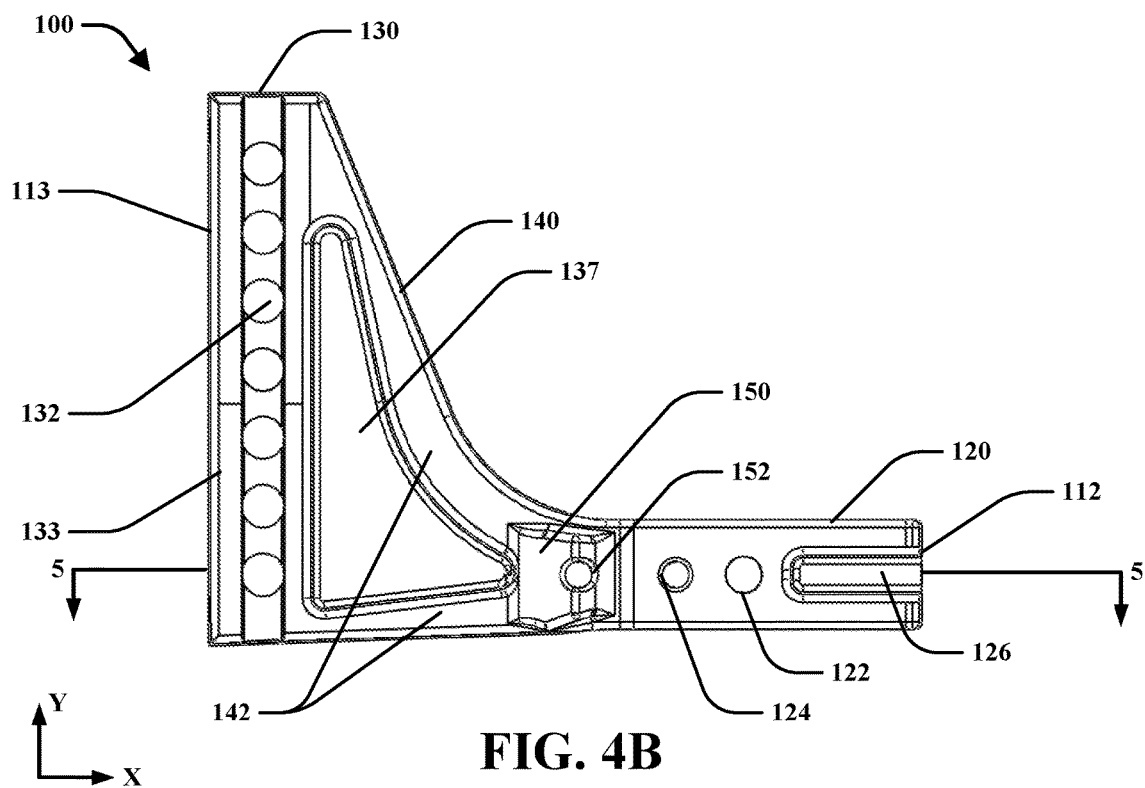
FIG. 4B is a side view of the embodiment of the hitch bar shown in FIG. 4A.

As shown in FIGS. 4A and 4B, the horizontal portion 120 may include a locking pin aperture 122 configured to receive a locking pin (not shown). The locking pin of any appropriate configuration may be inserted through a corresponding locking pin aperture (not shown) in the hitch receptacle 24. The locking pin 40 may be secured in place by a clip 42 for securing the horizontal portion 120 of the hitch bar 100 within the hitch receptacle 24, or any other appropriate method, such as a lock and lock body. The locking pin aperture 122 may be of any configuration such as being generally circular in cross-sectional shape to accept a locking pin (or a hitch pin).

In some embodiments, the horizontal portion 120 may further include a horizontal opening 124 positioned generally perpendicularly related to the base end 114. The horizontal opening 124 may be of any appropriate shape and size. In addition to being generally circular as shown, the horizontal opening 124 may be square, rectangular, oval or the like. The horizontal opening 124 may be utilized to reduce the material present on the hitch bar 100 such as to reduce the overall weight thereof or it may act as a second locking pin aperture.

The horizontal portion 120 may further include a horizontal slot 126. The horizontal slot 126 may define an I-beam shape to better conform to the receiving hitch. Alternatively, the square or rectangular shape may be continued through to the vehicle end 112. Any combination of the embodiments disclosed above is contemplated to be utilized together. For the sake of brevity, not every combination is described in detail, but all such combinations are contemplated by this disclosure. The horizontal slot 126 may be formed by removing (or when forming not including) material in the horizontal portion 120. The removed or reduced material may help reduce the overall weight of the hitch bar 100. In addition, the horizontal slot 126 may not be included at all in some embodiments. In these embodiments, the horizontal portion 120 may have a generally square cross-sectional shape (or any other appropriate cross-sectional shape as applicable, e.g., rectangular, circular or oval). Further, while the end of the horizontal portion 120 is shown with a generally squared off end, in some embodiments, the end may be slanted. The slanted end wall may allow insertion of the hitch bar 100 into the applicable receiver tube. All such embodiments are contemplated hereby.

The vertical portion 130 may be a generally I-beam configuration so as to allow a towing member 30 to operatively slide therein. The vertical portion 130 may includes plurality of towing apertures 132 that may be utilized to selectively attach the towing member 30 in a plurality of operative positions, such as that described in U.S. Pat. Nos. 8,979,112 and 9,199,520. The towing member 30 may, for example, be mounted to a coupler of the towing vehicle 16. The towing member 30 may be of any appropriate configuration and not limited to a hitch ball configuration. Some embodiments of the towing member 30 may be disclosed in U.S. Pat. Nos. 8,979,112 and 9,199,520. Further, the towing member 30 may include a single hitch ball, a plurality of hitch balls, a pintle hook, a hook, a step, or any combination of the foregoing.

The vertical portion 130 may extend upwardly from the base end 114 along the towing end 113 and include structural support 133 to allow the vertical portion 130 to maintain its structural orientation relative to the horizontal portion 120. The structural support 133 may be ridged and may extend from the receiving portion 114. The structural support 133 may be formed along either side of the vertical portion 130 or along both sides of the vertical portion 130. The structural support 133 may be formed monolithically with the hitch bar 100 or may be attached as through a subsequent operation, such as welding or the like.

On the towing end 113, the inclusion of the plurality of towing apertures 132 may allow for a variety of cross sectional shapes—varying, non-varying, and/or including optional cross members 142—with the illustration of FIG. 4B serving only as an exemplary arrangement. As shown, the towing end 113 may include a generally rectangular cut-out portion or a guide member 135, such as shown in FIG. 4A. While the generally rectangular cut-out portion 135 is shown, any appropriate shape may be utilized, including, without limitation, generally oval, generally semi-circular, and the like. The shape of the cut-out portion 135 may be utilized to operatively engage with the applicable towing member 30 member utilized with the hitch bar 100. The present teachings contemplate any configuration of engagement. The cut-out portion 135 may be formed with the structural support 133 or may be formed through a subsequent operation.

The transitional portion 140 may be generally triangular configuration and may include reinforcing cross members 142. The reinforcing cross members 142 (e.g., I-beams or gussets) may be incorporated along the portions of the hitch bar 100 both at its vehicle end 112 and in/proximate to the structure at the towing end 113 necessary to accommodate a series of vertically spaced plurality of towing apertures 132. The towing apertures 132 may cooperate with additional towing apparatus (not shown), such as by way of a non-limiting example, the towing member 30. Notably, cross members 142 may have a varying profile, particularly in the portions associated with the elevation change of the bar 100 (i.e., along the x- and y-axes), in order to further accommodate the distribution of load along the entirety of the hitch bar 100. The cross members 142 may be formed by removing material from (or not including during such material during formation) 137 of the towing end 113. The cross members 142 may provide strength to the hitch bar 100 while the cut-out portion 137 may help reduce the overall weight of the hitch bar 100. In other embodiments, the cut-out portion 137 may not be present.

A plurality of varying cross members 142 may be incorporated and, in some embodiments, situated generally along the top and bottom ends of bar 100, as well as along its towing end 113 (as shown in FIG. 4B). Similar or cooperating cross members 142 may be situated on opposing transverse sides of the bar 100. The illustration of FIG. 4B shows one embodiment for such cross members 142, with variable profiles provided in the blended and horizontal sections of the bar 100 proximate to its towing end 113 (i.e., between the wings 150, 155 and the plurality of towing apertures 132), as well as square and I-beam shapes (i.e., top and bottom ends of the cross members formed on opposing sides) proximate to its vehicle end 112.

The vertical portion 130 may be connected with the cross members 142 or monolithically formed therewith. The cross members 142 may also include a vertical profile positioned along the vertical portion within the frame 110 from bottom portion to a top portion. The cross members 142 may be made of any appropriate material, such as by way of a non-limiting example, it may be made of reinforced steel or other generally reinforced material. The cross members 142 may be formed generally of the same or a different material from the remaining parts of the hitch bar 100.

A pair of wing or flange features (or protruded portion) 150, 155 may be integrally formed within the frame of the hitch bar 100 to improve the stress distribution of the hitch bar 100, such as by way of a non-limiting example, in the region distal to the receiver connection/vehicle end 112. The wings 150, 155 may flare out in a transverse plane (i.e., parallel to the ground) to an apex or maximum point 160. At the apex 160, the widths of the wings 150, 155 are widest relative to one another and the main body/axis 162 of the hitch bar 100 as it transitions from the vehicle end 112 to the towing end 113. The wings 150, 155 may then taper back to fit the requisite standard size of the receiver tube at the vehicle end 112. Notably, the cross sectional profile (i.e., the shape defined along the y- and z-axes) need not be the same on the vehicle end 112 as it is at other points along the bar 100 (e.g., along x-axis, including any point between the vehicle and towing ends 112, 113).

Preferably, the hitch bar 100 may include two wings 150, 155 positioned on opposing transverse sides (i.e., along the z-axis) of the hitch bar 100—although the present teachings may include a single such wing. In some embodiments, the wings 150, 155 may have the same configuration. In other embodiments, the wings 150, 155 the wings 150, 155 may have a different configuration than one another. It should be understood, however, that this is merely one embodiment and that the present system that may apply to any configuration of the wings 150, 155. The wings 150, 155 may be preferably manufactured with a steel or metal selected for its appearance, mechanical strength/stress resistance, and cost, including, without limitation being formed from steel. It should also be understood, that the wings 150, 155 may be of any appropriate shape and size and are not limited to the hitch bar 100 shown in the drawings.

Figure 5A:
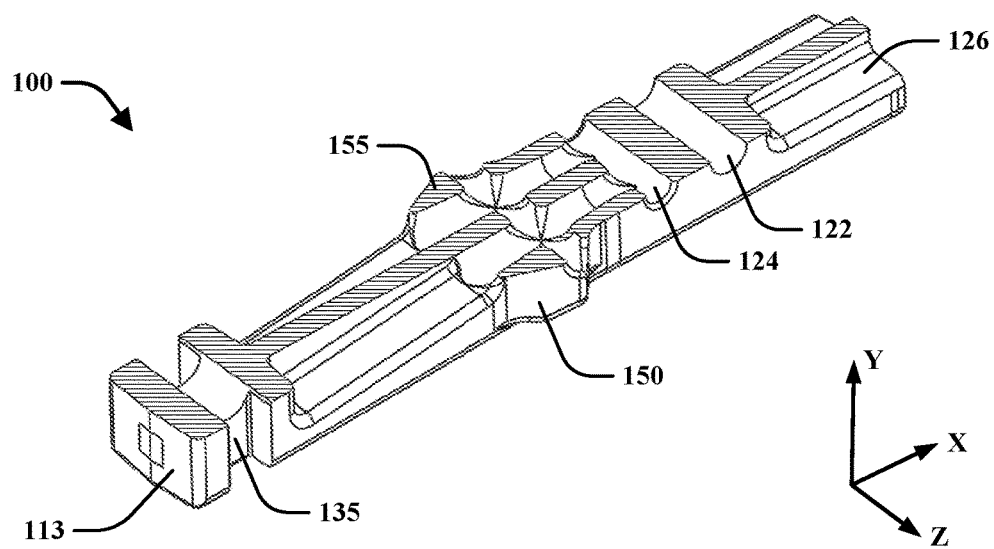
FIG. 5A is a cross-sectional perspective view of the embodiment of the hitch bar along with line 5-5 of FIG. 4B.
Figure 5B:
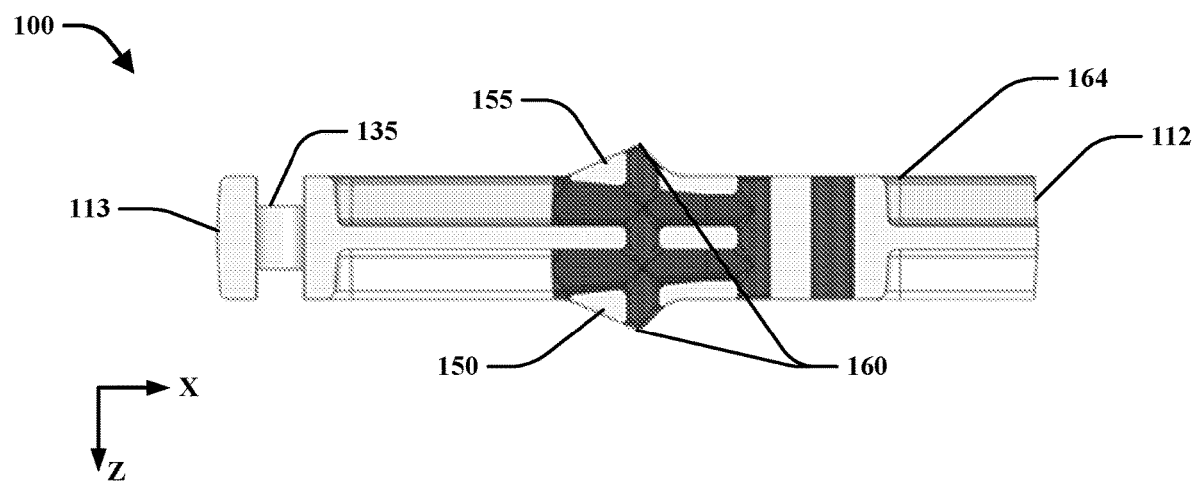
FIG. 5B is a top cross-sectional view of the hitch bar shown in FIG. 5A.

With respect to FIGS. 5A and 5B, in operation, the wings 150, 155 may distribute a load from the outer surface 164 of the hitch bar 100 at its widest part to the interior sides which are otherwise less stressed in bending during operation thereof. As such, the wings 150, 155 are expected to have a general bulging or V-shape in the transverse plane (i.e., the z-axis shown in FIG. 3). Further, the wings 150, 155 may optimally extend in at least one of the x- and y-axes shown in FIG. 3. More preferably, the wings 150, 155 may conform and blend with the elevational changes necessitated (i.e., both the x- and y- axes) by the plurality of towing apertures 132.

The configuration shown in FIGS. 3-5B and a prior art hitch bar were subjected to comparative finite element analysis. A 14,000 pound weight distribution fatigue load was simulated in conjunction with a standard 2.00 inch receiver having a square cross sectional shape.

A blended profile 157 may be added to the wings 150, 155. The blended profile 157 may engage with an elevation change only in the transverse direction (z-axis) without any elevational change in x- and y-axes. The design incorporating the wings 150, 155 reduced the peak stress down to 84,000 PSI at the peak stress point. However, the design incorporating the wings 150, 155 without the blended profile 157 exhibited the stress 94,000 PSI elsewhere along the hitch bar 100.

By adding the blended profile 157 to the wings 150, 155, the tapered profile of the wing may carry through multiple directions along the length of the hitch bar 100 where the wings 150, 155 may be situated. Stated differently, the profile of each wing in the y-and z-axes expands relative from the front to back of the bar 100 (i.e., along the x-axis) until the wing reaches its maximum width in the z-axis at the apex 160.

After achieving maximum width 160, the profile in the z-axis may be reduced while the y-axis continues to expand until the wing is blended with and be securely supported by the frame 110 and/or the reinforcing cross members 142 to meet its increased elevation (which is, as noted above, necessitated by the series of vertically spaced the plurality of towing apertures 132 provided at the towing end 113). Using the present disclosure, the design incorporating the wings 150, 155 and the blended profile 157 showed the peak stress down to 84,000 PSI at the peak stress point and a limited/reduced 89,000 PSI elsewhere along the hitch bar 100.

Figure 6A:
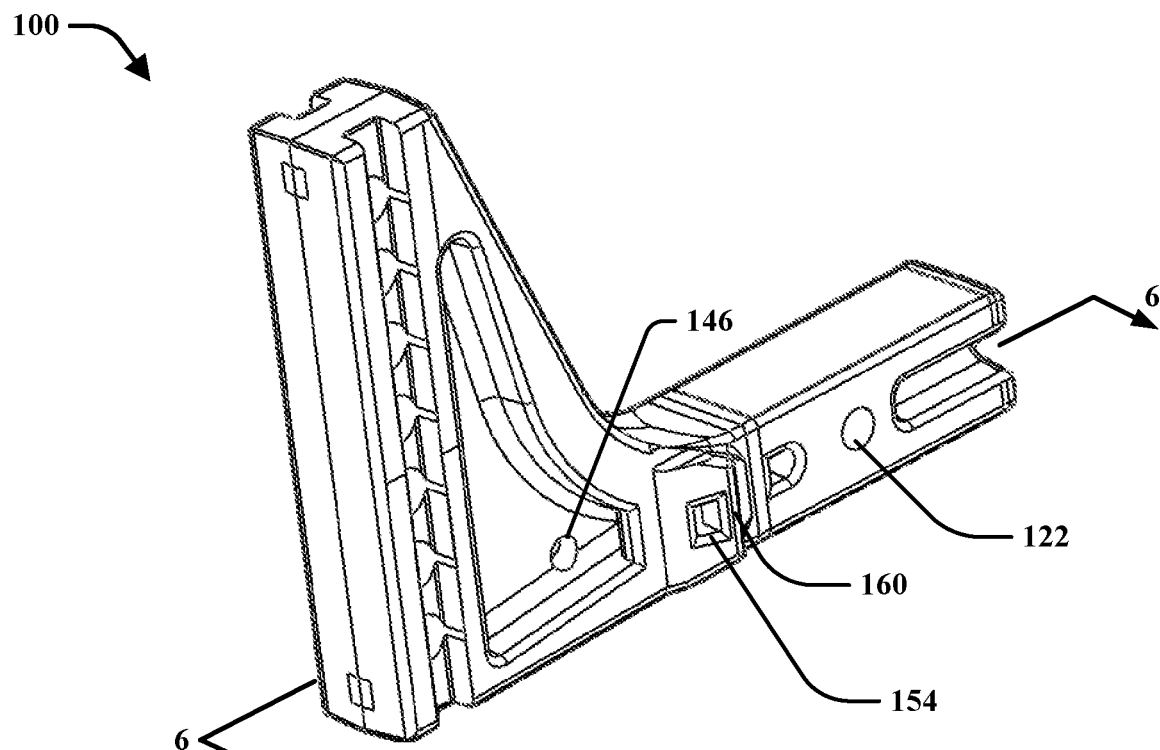
FIG. 6A is a perspective view of another embodiment of the hitch bar.
Figure 6B:
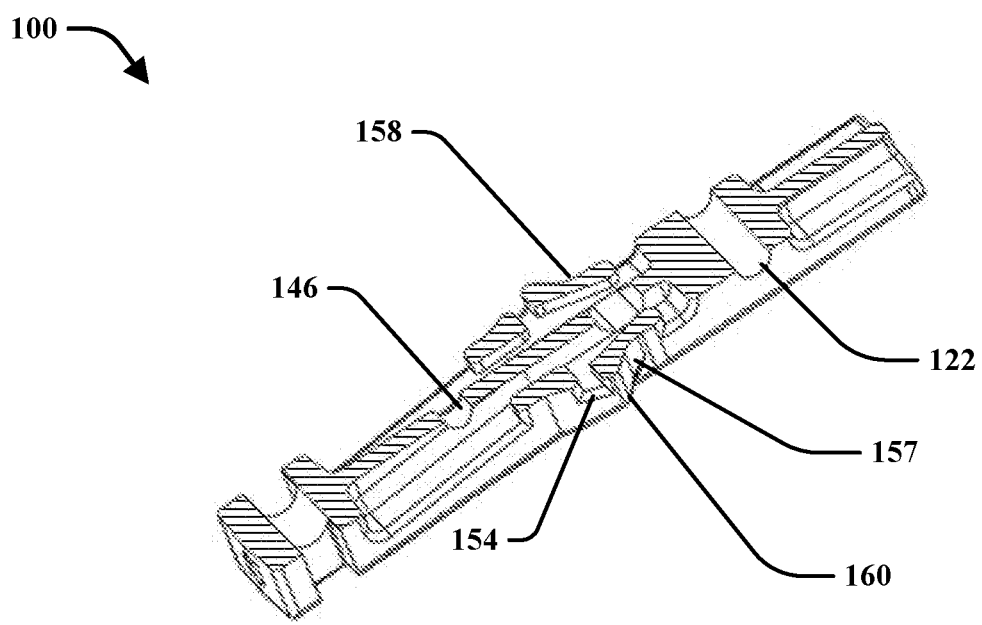
FIG. 6B is a cross-sectional view of the hitch bar shown in FIG. 6A along line 6-6.

In certain embodiments, the flared appearance of the flanges may also serve an aesthetic or ornamental feature 158 as shown in FIG. 6B. For example, additional features may be added beyond the functional aspect of the aforementioned assembly. The aesthetic feature 158 may be of any appropriate shape, size, type or configuration, whereby it may extend at an appropriate angle between the base member and the top member. The curvature may be selected for the type of towing environment and the desired slope for towing. The present disclosure, however, is not limited to any particular shape or length of the curvature as the curvature may be of any appropriate shape or length.

This application includes the pair of wings 150, 155 having various embodiments. As illustrated by FIG. 4B, the wings 150, 155 may include an opening 152. In one embodiment, the opening 152 may generally round shape. The opening 152 may generally align with the apex 160 that extends from the base end 114 of the cross member. The opening 152 may be of any appropriate shape or size, such as having a generally tubular, square, rectangular, or the like shape, and may be sized to generally fit in a transitional body 148. The opening 152 may be utilized to reduce the weight of the hitch bar 100 and while permitting the improved distribution of the load described above.

In one embodiment, the wings 150, 155 may wedgingly engage the receiver hitch. The hitch bar 100 may be inserted into the receiver tube of the receiver hitch. As the horizontal portion 120 moves further into the receiver tube of the receiver hitch, the width of the wings 150, 155 increases causing the wings 150, 155 to wedgingly engage the receiver hitch. This may selectively engage the hitch bar 100 in an operative position.

FIGS. 6A and 6B illustrate another embodiment of the wings 150, 155 in accordance with the instant disclosure. The wings 150, 155 may include a generally rectangular opening 154. The rectangular opening 154 may be provided in the wings along the base end 114. The rectangular opening 154 may be utilized to reduce the weight of the hitch bar 100 and while allowing the improved distribution of the load. The rectangular opening 154 may be of any appropriate shape or size, such as having a generally square, hexagonal, or the like shape, and may be sized to generally fit in the transitional portion 140.

In particular embodiment, the transitional portion 140 may further include a transitional portion opening 146. The transitional portion opening 146 may be of any appropriate shape or size, such as having a generally tubular, square, rectangular, or the like shape, and may be sized to generally fit in a transitional body 148. The transitional portion opening 146 may be utilized to reduce the weight of the hitch bar 100 and to permit the improved distribution of the load.

Figure 7A:
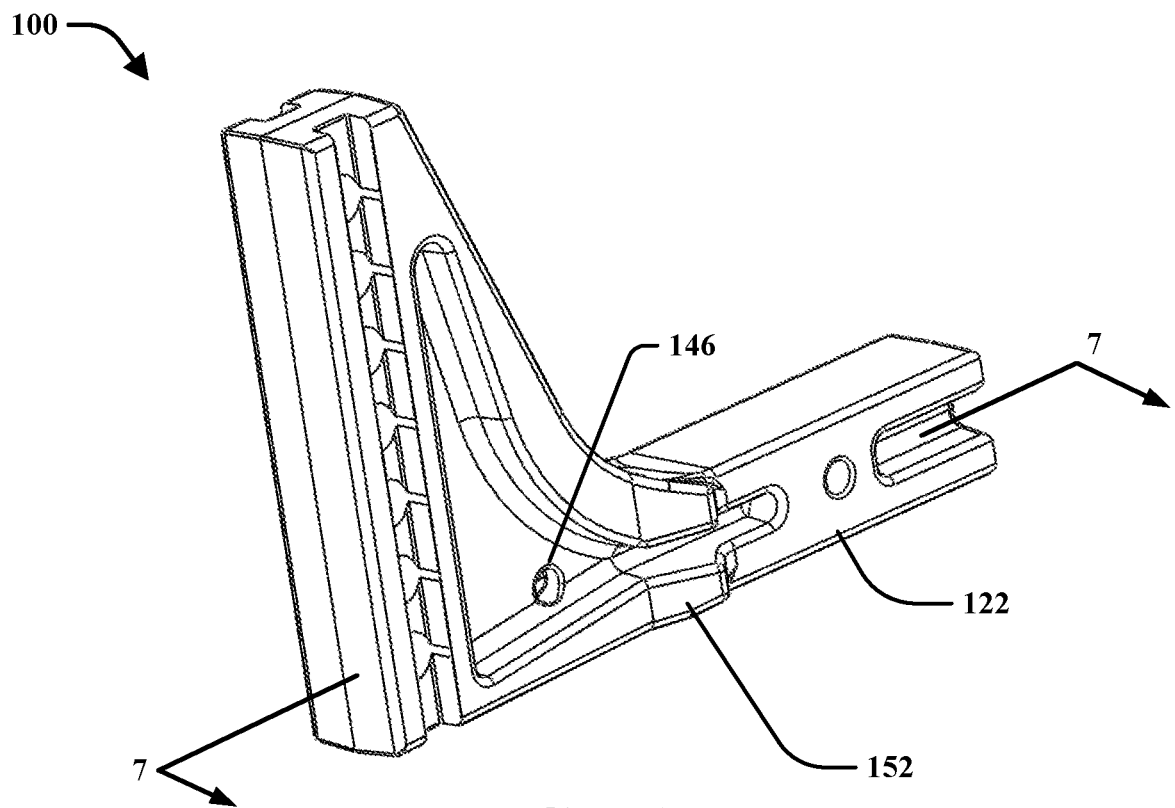
FIG. 7A is a perspective view of another embodiment of the hitch bar.
Figure 7B:
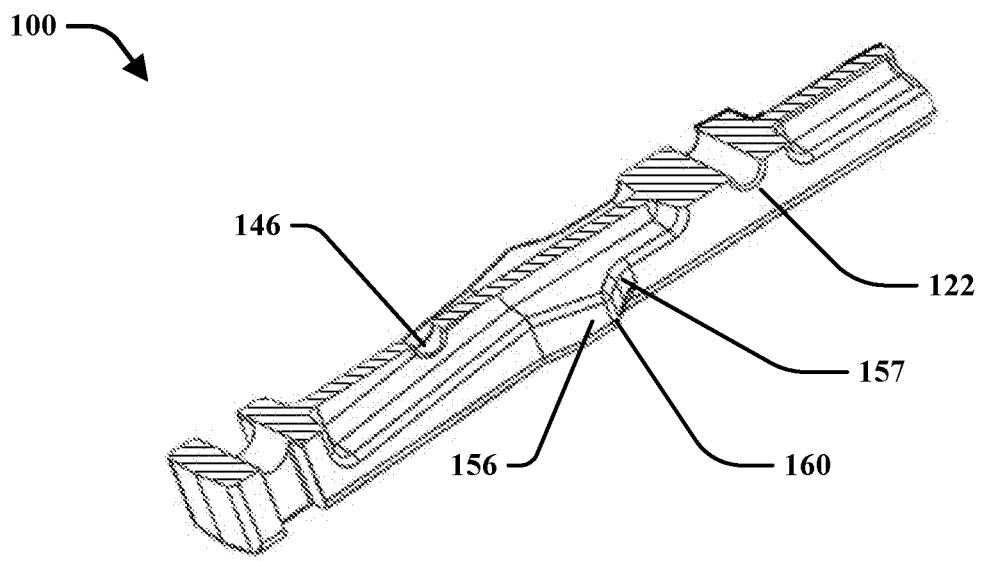
FIG. 7B is a cross-sectional view of the hitch bar shown in FIG. 7A along line 7-7.

Referring to FIGS. 7A and 7B, provided is alternative embodiment of the wings 150, 155. This embodiment may further include a slotted opening 156. The slotted opening 156 may be positioned about the perimeter of the wings 150, 155 and be generally aligned along the base end 114. The slotted opening 156 may include various widths along the base end 114. These are merely exemplary embodiments and the present assembly may utilize any appropriate configuration of the slotted opening 156 or any wings for that matter. Further, depending upon the application of the present system, specific capabilities of the slotted opening 156 may be required.

Figure 8:
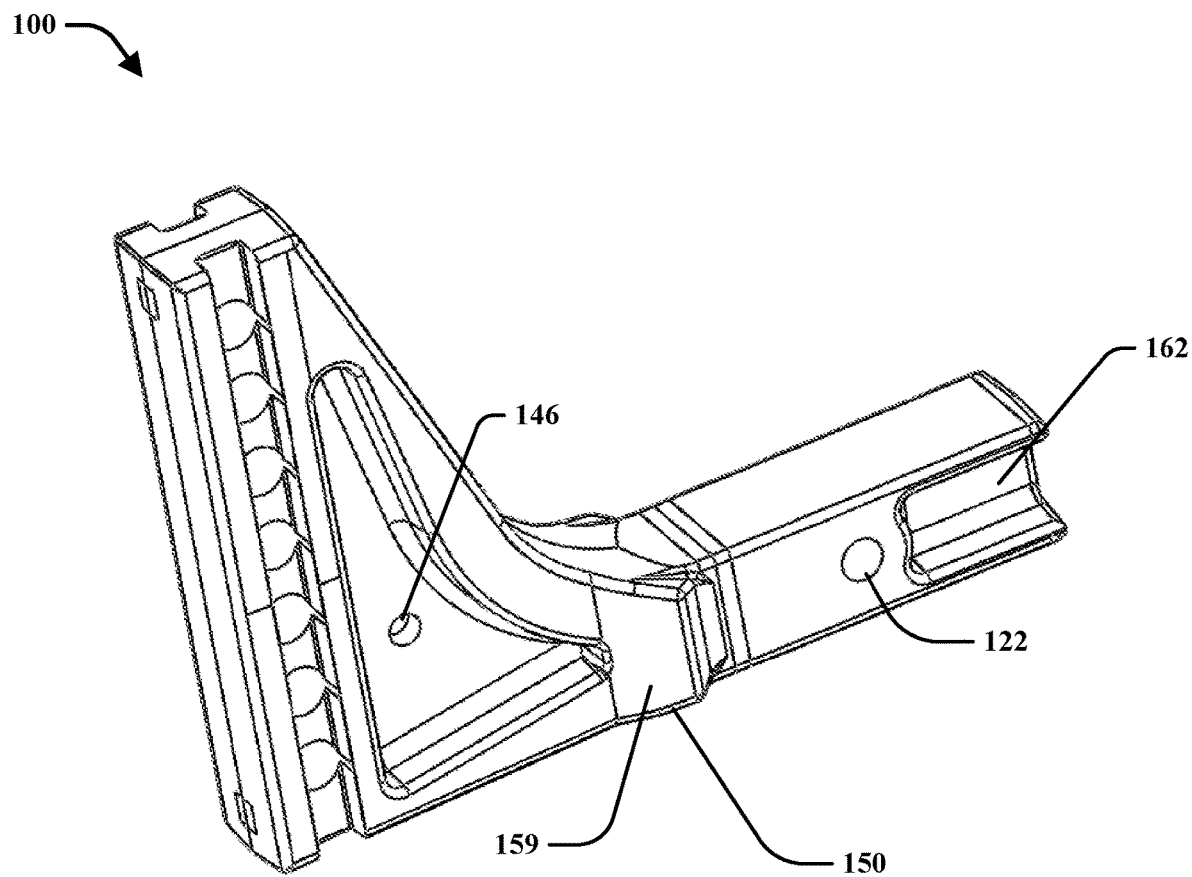
FIG. 8 is a perspective view of other embodiment of the hitch bar.

With respect to FIG. 8, in some embodiments, the wings 150, 155 may include a solid surface 159 without the opening 152. In this embodiment, the wings 150, 155 may include a density profile along the base end 114 depending on the application. The wing 155 may extend about a portion of opposing sides of the perimeter of the hitch bar 100. The opposing wing 155 may extend a similar angle extending outwardly from the perimeter in relation to a central axis 162 as viewed from above.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modi-

Having thus described the invention, the following is claimed:

1. A hitch bar comprising:
   a vertical portion;
   a transition portion connected to the vertical portion; and
   a horizontal portion connected to the transitional portion and positioned at an opposite end of the vertical portion, wherein the horizontal portion comprises a vehicle end and a towing end; and
   a protruded portion attached to the horizontal portion, the protruded portion having a profile oriented at a perpendicular angle relative to the horizontal portion, the profile providing a zone of distributing a load along the horizontal portion and wherein the protruded portion flares out in a transverse plane from the vehicle end toward the towing end of the horizontal portion.

2. The hitch bar of claim 1, wherein the protruded portion further includes an opening.

3. The hitch bar of claim 1 further comprising a slot integrated with the protruded portion extending along the horizontal portion.

4. The hitch bar of claim 1, further comprising a slotted opening integrated with the horizontal portion providing additional zone of distributing a load along the horizontal portion.

5. The hitch bar of claim 1, further comprising a cross member in the transitional portion.

6. A hitch bar comprising:
   a vehicle attachment member capable of selective engagement with a towing vehicle;
   a shank extending from the vehicle attachment member, the shank having a length;
   a guide member positioned in and extending at least a portion of the length of the shank; and
   a protruded portion attached to the vehicle attachment member, the protruded portion having a profile oriented at a perpendicular angle relative to the vehicle attachment member and wherein the protruded portion has a width greater than the vehicle attachment member, the profile distributing a load along with vehicle attachment member.

7. The hitch bar of claim 6, wherein the protruded portion includes a generally V-shape relative from the vehicle attachment member.

8. The hitch bar of claim 6, wherein the protruded portion includes a generally elevated shape to an apex relative from the vehicle attachment member.

9. The hitch bar of claim 8, the protruded portion further includes a blended profile.

10. The hitch bar of claim 6, wherein the protruded portion includes a round opening.

11. The hitch bar of claim 6, wherein the protruded portion includes a rectangular opening.

12. The hitch bar of claim 11, wherein the generally rectangular opening is positioned adjacent to the apex.

13. The hitch bar of claim 6, wherein the protruded portion includes a slot.

14. The hitch bar of claim 6, wherein the protruded portion is positioned in proximity to the vehicle attachment member.

15. A hitch bar comprising:
   a vehicle attachment member capable of selective engagement with a towing vehicle;
   a shank extending from the vehicle attachment member, the shank having a length;
   a guide member positioned in and extending at least a portion of the length of the shank; and
   a protruded portion attached to the vehicle attachment member, the protruded portion having a profile oriented at a perpendicular angle relative to the vehicle attachment member, the profile distributing a load along with vehicle attachment member and wherein the protruded portion includes a round opening.

16. A hitch bar comprising:
   a vehicle attachment member capable of selective engagement with a towing vehicle;
   a shank extending from the vehicle attachment member, the shank having a length;
   a guide member positioned in and extending at least a portion of the length of the shank; and
   a protruded portion attached to the vehicle attachment member, the protruded portion having a profile oriented at a perpendicular angle relative to the vehicle attachment member, the profile distributing a load along with vehicle attachment member and wherein the protruded portion includes a rectangular opening.

17. A hitch bar comprising:
   a vehicle attachment member capable of selective engagement with a towing vehicle;
   a shank extending from the vehicle attachment member, the shank having a length;
   a guide member positioned in and extending at least a portion of the length of the shank; and
   a protruded portion attached to the vehicle attachment member, the protruded portion having a profile oriented at a perpendicular angle relative to the vehicle attachment member, the profile distributing a load along with vehicle attachment member and wherein the protruded portion includes a slot.

* * * * *